United States Patent
Kostepen

(10) Patent No.: US 10,289,921 B2
(45) Date of Patent: May 14, 2019

(54) METHOD OF OPERATING AN IN-VEHICLE CAMERA

(71) Applicant: Panasonic Automotive Systems Company of America, Division of Panasonic Corporation of North America, Peachtree City, GA (US)

(72) Inventor: Hakan Kostepen, Los Gatos, CA (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 692 days.

(21) Appl. No.: 14/666,973

(22) Filed: Mar. 24, 2015

(65) Prior Publication Data
US 2015/0271456 A1    Sep. 24, 2015

Related U.S. Application Data

(60) Provisional application No. 61/969,702, filed on Mar. 24, 2014.

(51) Int. Cl.
*H04N 7/18* (2006.01)
*G06K 9/00* (2006.01)

(52) U.S. Cl.
CPC ..... *G06K 9/00832* (2013.01); *G06K 9/00791* (2013.01); *H04N 7/181* (2013.01)

(58) Field of Classification Search
CPC ...... B60R 1/00; B60R 2300/105; H04N 7/181
USPC .......................... 348/113–118, 148, 836–840
See application file for complete search history.

(56) References Cited

U.S. PATENT DOCUMENTS

| | | | | |
|---|---|---|---|---|
| 7,444,238 B1* | 10/2008 | Opitz | ..................... | G01C 21/28 701/454 |
| 2007/0019072 A1* | 1/2007 | Bengtsson | ......... | B64D 11/0015 348/148 |
| 2011/0112761 A1* | 5/2011 | Hurley | ................... | G01C 21/32 701/465 |
| 2012/0262277 A1* | 10/2012 | Oliveira | ................. | H04L 67/18 340/8.1 |

* cited by examiner

*Primary Examiner* — Anand S Rao
(74) *Attorney, Agent, or Firm* — Laurence S. Roach, Esq.

(57) ABSTRACT

A method of operating an in-vehicle camera includes providing a database of geographic locations of points of interest. It is detected that the vehicle has arrived at one of the geographic locations of the points of interest. In response to the detecting step, capturing of images with the camera is automatically begun.

20 Claims, 2 Drawing Sheets

METHOD OF OPERATING AN IN-VEHICLE CAMERA

CROSS-REFERENCE TO RELATED APPLICATIONS

This application claims the benefit of U.S. Provisional Application No. 61/969,702 filed on Mar. 24, 2014, which the disclosure of which is hereby incorporated by reference in its entirety for all purposes.

BACKGROUND OF THE INVENTION

1. Field of the Invention

The present invention relates to operating electronic devices that may be installed in a motor vehicle, and, more particularly, to operating a camera that may be installed in a motor vehicle.

2. Description of the Related Art

Today cameras are commonly installed near the rear bumpers of motor vehicles to provide the drivers with rear views so that the drivers can see what is behind them when they are driving in reverse. What is needed in the art is a method of expanding the range of information that is captured by in-vehicle cameras and making use of the additional information provided by the cameras.

SUMMARY OF THE INVENTION

The invention may provide an arrangement including a plurality of cameras that are installed both within and outside a passenger compartment of a motor vehicle. Thus, events and objects both within and outside of the vehicle may be selectively captured on video and stored for later reference. In this way, the invention may enhance the use of camera applications associated with a motor vehicle.

In one embodiment, the invention comprises a method of operating an in-vehicle camera, including providing a database of geographic locations of points of interest. It is detected that the vehicle has arrived at one of the geographic locations of the points of interest. In response to the detecting step, the camera automatically begins to capture images.

In another embodiment, the invention comprises a method of operating an in-vehicle camera, including detecting that the vehicle has been in a collision. In response to the detecting step, the camera automatically begins to capture images.

In yet another embodiment, the invention comprises a method of operating an in-vehicle camera, including detecting a security breach by use of a security system. In response to the detecting step, the camera automatically begins to capture images.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

Glossary

GPS module—a device that uses the Global Positioning System to ascertain the geographical location of a vehicle and possibly to record the vehicle location at periodic intervals.

Point of interest—a specific point location that someone may find useful or interesting. Examples are Disneyland and the Grand Canyon Security breach—a situation that may pose a danger to a person, or may pose an increased likelihood that a thing will be damaged or stolen.

The embodiments hereinafter disclosed are not intended to be exhaustive or limit the invention to the precise forms disclosed in the following description. Rather the embodiments are chosen and described so that others skilled in the art may utilize its teachings.

Figure 1:
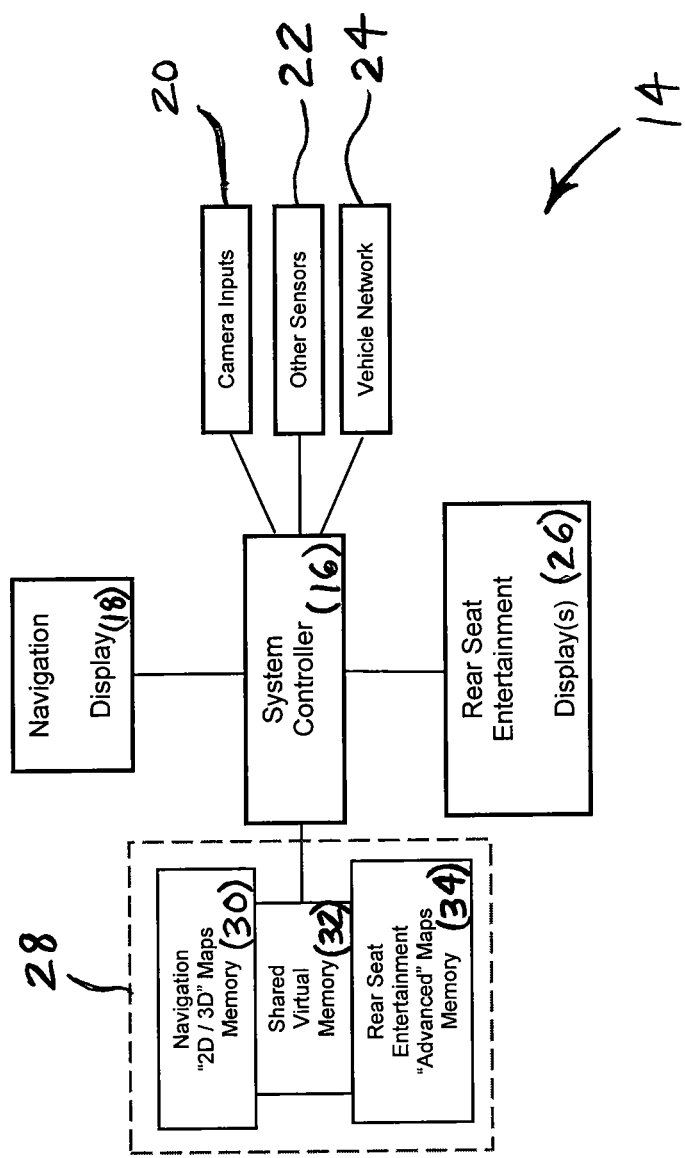
FIG. 1 is a block diagram of one embodiment of a vehicle camera operating system of the present invention.

FIG. 1 is a block diagram of one embodiment of a vehicle camera operating system 14 of the present invention, including a system controller 16, a navigation display 18, camera inputs 20, other sensors 22, a vehicle network 24, rear seat entertainment display(s) 26, and memory device 28. Memory device 28 includes a navigation 2D/3D maps memory 30, a shared virtual memory 32, and a rear seat entertainment advanced maps memory 34.

System controller 16 may have navigation, audio, video and connectivity applications resident, as well as a GPS sensor input. System controller 16 may also be responsible for synchronizing an interface between navigation and connectivity (i.e., location based services) applications, camera applications and rear seat entertainment applications.

Shared virtual memory 32 stores a location based/GPS dynamic data base which links the navigation, camera and rear seat entertainment applications together.

The present invention provides a plurality of camera applications all of which may employ the same platform. In a first such camera application, one or more cameras capture an event in and/or around the vehicle. The capturing of the video may be triggered by the driver/user or may be triggered by the vehicle arriving at a geographic location that the system recognizes as being a location of interest that the user would probably like a video of. For example, if the vehicle arrives at a point of interest such as Disneyland, then the cameras may begin recording images of the surrounding interior and/or exterior views of the car. Various points of interest may be stored in a lookup table in association with the geographic locations of the points of interest. The vehicle GPS system may sense when the vehicle arrives at a geographic location that is in the lookup table as being associated with a point of interest. When such a geographic location is arrived at, the system may prompt the user to indicate whether he would like the cameras to begin recording video. The prompt may be an audible message played on speakers within the passenger compartment, or may be a text message displayed on a screen of the vehicle infotainment system, for example. Again, the capturing of the video may be triggered by a user within the vehicle or may be automatically triggered by the vehicle based on the GPS location of the vehicle. Another example of an event that can trigger the cameras may be a tailgate party for a football game. In such an example, the vehicle may determine that it is at a tailgate party based not only on the vehicle's GPS location, but also on an online news feed or in-vehicle calendar that indicates that a football game is scheduled at that GPS location later that day.

In a second such camera application, cameras capture an event outside the vehicle. The capturing of the video may be triggered by a driver in the course of the driver's job, or may be triggered by the vehicle arriving at a particular geographic location. For example, the driver may be a real estate agent driving home buyers around to prospective houses. That is, the cameras may record the home search both in the exterior area surrounding the car and in the interior of the car as the real estate agent visits various houses during the day with clients. Thus, the agent and the buyers may be provided with a record of the day, and of the houses seen during the day. A list of house addresses to be visited that day may be entered into the system, and when the GPS module senses that the vehicle has arrived at one of the addresses, then camera recording begins. When the GPS module senses that the vehicle has departed from the address, then camera recording stops. If the agent and buyers decide to spontaneously visit a house that was not on the address, then the cameras may be manually triggered to recorded the visit to the additional house address.

In a third such camera application, cameras may capture an event triggered by the vehicle network. For example, if an air bag sensor senses an accident, then the cameras may be triggered to begin recording the car's interior and exterior surroundings.

In a fourth such camera application, cameras may capture a security breach event triggered by an in-vehicle security system, by a home security system when the vehicle is in the home's garage or driveway, or by the pressing of a driver's panic pushbutton, such as on a key fob. For example, the home security system may sense a break-in, and, in response thereto, command the in-vehicle cameras to begin capturing video. As a deterrence, warning stickers may be placed on the windows of the vehicle and/or home, informing would-be thieves of the presence of the cameras.

Figure 2:
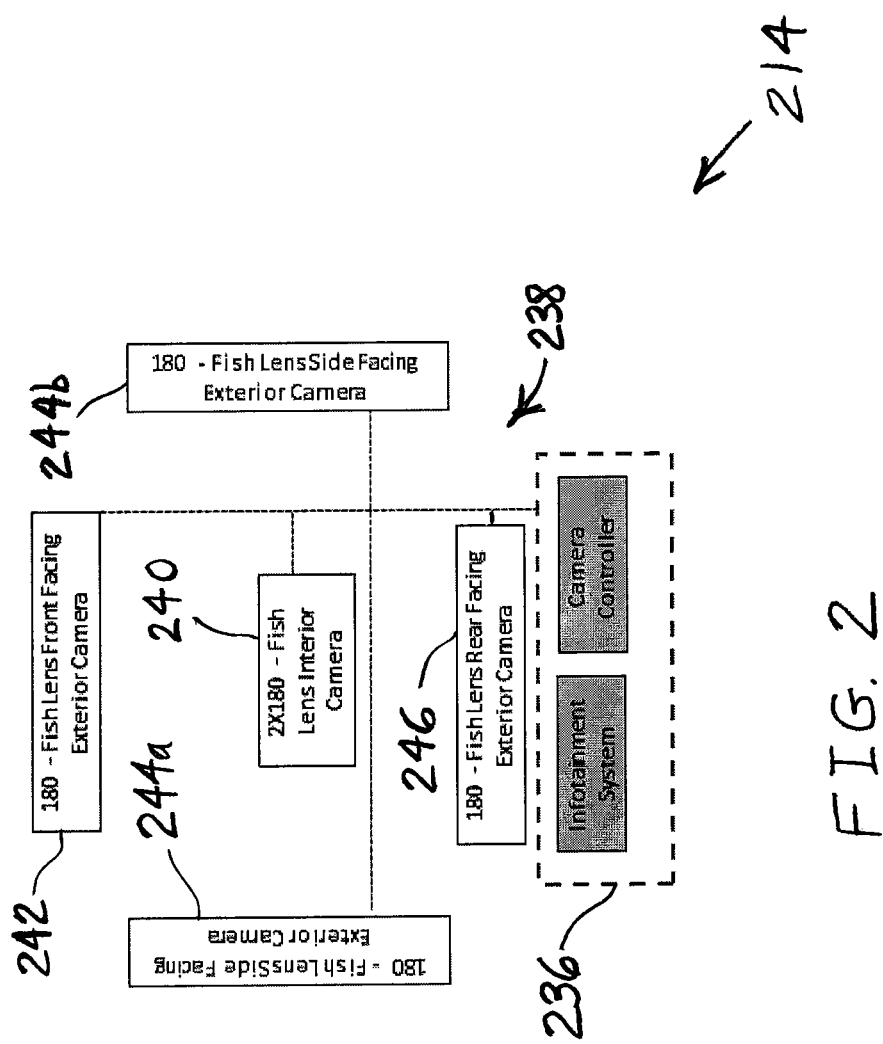
FIG. 2 is a block diagram of another embodiment of a vehicle camera operating system of the present invention.

Another embodiment of a vehicle camera operating system 214 of the present invention is shown in FIG. 2, including a combination infotainment system and camera controller 236 communicatively coupled to a camera network 238. Camera network 238 includes two 180 degree fish lens interior cameras 240, a front facing 180 degree fish lens exterior camera 242, two side facing 180 degree fish lens exterior cameras 244a-b, and a rear facing 180 degree fish lens exterior camera 246. The two 180 degree fish lens interior cameras 240 may face in opposite directions such that substantially the entire interior space of the passenger compartment is within the field of view of at least one of the two cameras. For example, cameras 240 may be back-to-back facing away from each other, or may be facing each other. Thus, camera network 238 may capture video of substantially any point in space within the vehicle or external to the vehicle but within view of the vehicle.

In one embodiment, the driver and/or a passenger triggers the recording and/or uploading of video. More particularly, a driver and/or passenger may control or command the system to start and/or stop recording. The camera may record the surrounding view of the interior of the vehicle and the exterior of the vehicle on a memory device. The memory device may be in the form of an SD Card or an embedded memory, for example. Further, the driver and/or passenger may control or command the system to start uploading the captured video of the interior/exterior of the vehicle from the memory device to a playback device, such as a screen or a monitor.

In one embodiment, a car network event triggers the recording and/or uploading of video. More particularly, a car network event (e.g., an air bag launch) may control or command the system to start and/or stop recording. The camera may record the surrounding view of the interior of the vehicle and the exterior of the vehicle on a memory device. The memory device may be in the form of an SD Card or an embedded memory, for example. Further, the driver and/or passenger may control or command the system to start uploading the captured video of the interior/exterior of the vehicle from the memory device to a playback device, such as a screen or a monitor.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating an in-vehicle camera, comprising the steps of:
   providing a database of geographic locations of points of interest;
   detecting that the vehicle has arrived at one of the geographic locations of the points of interest; and
   in response to the detecting step, beginning to capture images with the camera.

2. The method of claim 1 wherein the vehicle includes a plurality of cameras, and, in response to the detecting step, all of the cameras automatically begin to capture images.

3. The method of claim 2 wherein the plurality of cameras include at least one camera capturing images within a passenger compartment of the vehicle, and at least one camera capturing images outside of the vehicle.

4. The method of claim 1 wherein the camera captures images within a passenger compartment of the vehicle.

5. The method of claim 1 wherein the camera captures images outside of the vehicle.

6. The method of claim 1 wherein the detecting step is performed by a GPS module.

7. The method of claim 1 further comprising prompting a user to indicate whether he would like the camera to begin capturing images, and the images are begun being captured only if an indication is received from the user that he would like the camera to begin capturing images.

8. The method of claim 1 wherein the images are begun being captured automatically in response to the detecting step.

9. A method of operating an in-vehicle camera, comprising the steps of:
   detecting that the vehicle is at a certain geographic location;
   determining a current date and time of day; and
   in response to the detecting and determining steps, beginning to capture images with the camera.

10. The method of claim 9 wherein the vehicle includes a plurality of cameras, and, in response to the detecting and determining steps, all of the cameras automatically begin to capture images.

11. The method of claim 10 wherein the plurality of cameras include at least one camera capturing images within a passenger compartment of the vehicle, and at least one camera capturing images outside of the vehicle.

12. The method of claim 9 wherein the camera captures images within a passenger compartment of the vehicle.

13. The method of claim 9 wherein the camera captures images outside of the vehicle.

14. The method of claim 9 wherein the detecting step is performed by a GPS module.

15. The method of claim 9 further comprising prompting a user to indicate whether he would like the camera to begin capturing images, and the images are begun being captured only if an indication is received from the user that he would like the camera to begin capturing images.

16. The method of claim 9 wherein the images are begun being captured automatically in response to the detecting and determining steps.

17. The method of claim 9 wherein the images are begun being captured in response to ascertaining that the certain geographic location and the current date and time of day coincide with an event in an electronic calendar associated with the vehicle or with a user of the vehicle.

18. A vehicle, comprising:
    at least one camera;
    a memory device;
    a global positioning system;
    a processor communicatively coupled to each of the camera, the memory device and the global positioning system, the processor being configured to:
        access a database of geographic locations of points of interest;
        use the global positioning system to detect that the vehicle has arrived at one of the geographic locations of the points of interest;
        in response to the detecting that the vehicle has arrived at one of the geographic locations of the points of interest, capture images by use of the camera; and
        store the images in the memory device.

19. The vehicle of claim 18 wherein the at least one camera comprises a plurality of cameras, the processor being configured to capture images by use of all of the cameras in response to the detecting that the vehicle has arrived at one of the geographic locations of the points of interest, wherein the plurality of cameras include at least one camera capturing images within a passenger compartment of the vehicle, and at least one camera capturing images outside of the vehicle.

20. The vehicle of claim 18 wherein the processor is configured to prompt a user to indicate whether he would like the camera to begin capturing images, and the images are captured only if the processor receives an indication that he would like the camera to begin capturing images.

* * * * *